US012730436B2

(12) United States Patent
Felix et al.

(10) Patent No.: US 12,730,436 B2
(45) Date of Patent: Sep. 8, 2026

(54) STORAGE APPLIANCE FOR CONTROLLER PLATFORMS

(71) Applicant: Honeywell International Inc., Charlotte, NC (US)

(72) Inventors: Joseph P. Felix, Phoenixville, PA (US); Paul F. McLaughlin, Ambler, PA (US); James M. Schreder, Perkasie, PA (US); Michael J. Waynick, Hartboro, PA (US)

(73) Assignee: Honeywell International Inc., Charlotte, NC (US)

( * ) Notice: Subject to any disclaimer, the term of this patent is extended or adjusted under 35 U.S.C. 154(b) by 779 days.

(21) Appl. No.: 18/108,196

(22) Filed: Feb. 10, 2023

(65) Prior Publication Data

US 2024/0272626 A1 Aug. 15, 2024

(51) Int. Cl.
*G05B 19/418* (2006.01)

(52) U.S. Cl.
CPC . *G05B 19/41855* (2013.01); *G05B 19/41865* (2013.01); *G05B 2219/23336* (2013.01)

(58) Field of Classification Search
USPC .............................................................. 700/11
See application file for complete search history.

(56) References Cited

U.S. PATENT DOCUMENTS 5,088,021 A * 2/1992 McLaughlin ............ G05B 9/03 714/11
6,901,298 B1 5/2005 Govindaraj et al.
9,817,590 B2 11/2017 Kim
2002/0184410 A1* 12/2002 Apel .................. G06F 11/2017 710/5
2007/0168058 A1* 7/2007 Kephart .............. G06F 11/2038 714/13
2009/0183002 A1 7/2009 Rohrer et al.
2011/0208324 A1 8/2011 Fukatsu
2018/0196615 A1* 7/2018 Gandelsman ....... G06F 11/1464
2020/0250049 A1* 8/2020 Lee ..................... G06F 11/1471
(Continued)

OTHER PUBLICATIONS

TW_201513613_A (Year: 2015).*
(Author Unknown), Automatic Backup for PLCs, Yokogawa, Application Note, CCUS-G-02A, Jul. 2007.

*Primary Examiner* — Hien D Khuu
(74) *Attorney, Agent, or Firm* — Paschall & Associates, LLC; James C. Paschall; Anthony Miologos

(57) ABSTRACT

A method and network control system for an industrial processing facility (IPF) including, a plant-wide network coupling at least one controller platform. The controller platform comprising computing hardware and a memory and at least one application module (AM) contained in the memory. The AM comprising a control application, data, configuration and state information for the controller platform, wherein the at least one controller platform is coupled by an input/output network to I/O devices coupled to field devices that are coupled to processing equipment on a field level of an industrial processing facility (IPF). A storage appliance coupled to the plant-wide network is arranged to receive a copy of the AM contained in the controller platform to a backup application in the storage appliance. The backup application returning the AM back to the controller platform to recover and restore a failed controller platform to normal operation.

18 Claims, 3 Drawing Sheets

(56) References Cited

U.S. PATENT DOCUMENTS

| | | | | |
|---|---|---|---|---|
| 2020/0250141 | A1* | 8/2020 | Liu | G06F 11/1451 |
| 2020/0310920 | A1* | 10/2020 | McLaughlin | G06F 9/5011 |
| 2020/0313960 | A1* | 10/2020 | Rosa-Bian | G06F 11/2007 |
| 2021/0302927 | A1* | 9/2021 | McLaughlin | G06F 11/2025 |
| 2021/0303499 | A1* | 9/2021 | McLaughlin | G06F 13/4027 |
| 2022/0121179 | A1* | 4/2022 | Sakata | G05B 9/02 |
| 2022/0245100 | A1* | 8/2022 | Kandi | G06F 16/214 |

* cited by examiner

STORAGE APPLIANCE FOR CONTROLLER PLATFORMS

TECHNICAL FIELD

This disclosure is generally directed to controllers for network control systems. More specifically to a storage appliance for backing-up and restoring the control execution environment of controller platforms.

BACKGROUND

In deployments of conventional network control systems, the entity which is hosting the control function and responsible for the related control calculations (such as proportional integral differential (PID) control calculations) is typically an embedded computer device/platform, typically described as being a process "controller." Each controller comprises computing hardware generally including at least one processor or other computing device having an associated memory, such as being an embedded controller. What is referred to herein as a "controller platform" comprises one controller or a pair of controllers in the case of redundant controllers, where the controller platform hosts in its memory a control software "application module" such as the commercially available EXPERION control execution environment (CEE), marketed by Honeywell International Inc., hereafter cumulatively referred to as an Application Module (AM).

Each "controller platform" communicates in a level above with at least one server over a plant-wide network, and levels below typically through an I/O network, then I/O devices, then sensors and actuators that control a portion of the processing equipment in the plant. In order to ensure a high level of control system availability, the controllers in a network control system are typically deployed in a scheme which provides hardware redundancy. Specifically two controller platforms deployed to do the job of one, or more specifically, a "primary" controller which is actively executing the control mission and a "backup" controller which is on standby, ready to assume the control mission if there is a failure of the primary controller. Accordingly, traditional high availability control system redundancy uses a primary controller along with a backup controller for each controller platform, which in the simplest non-redundancy control system case consists of a single controller. Upon the failure of a primary controller in a redundant controller pair controller platform, non-redundant operation using the backup controller continues until a repair or replacement is made to the primary controller to restore the controller redundancy in the controller platform. The AMs are conventionally deployed in a ratio of 1.1 with the controller platforms. This means each controller platform whether redundant or not always hosts only one AM.

In the deployments explained above, the backup can take over on failure of a primary controller only when the backup controller it is fully synchronized to the primary controller. If the primary fails when it is not synchronized, or only partially synchronized, then the backup typical does not take over. In certain controller deployments memory retention systems using non-volatile memory or random access memory (RAM) systems are used that are retained by the primary when the AM is recovered. However, if the hardware has failed and the AP module replaced, then user intervention is required to restore the configuration.

In certain controller deployments controller platforms are coupled to one another by a private path redundancy network providing a controller pool, each controller platform having at least one controller including computing hardware and a memory. An application module (AM) pool includes a plurality of AMs, wherein the controller platforms are coupled by an input/output mesh network to input/output devices coupled to field devices, such as the EXPERION highly integrated virtual environment (HIVE) control system technology, marketed by Honeywell International Inc. Within a HIVE controller deployment loss of an unsynchronized or non-redundant primary control application requires user intervention to restore an AM configuration and state.

SUMMARY

This disclosure relates to a storage appliance for backing-up and restoring the control execution environment of controller platforms.

In a first embodiment a method is disclosed comprising, providing a network process control system in an industrial processing facility (IPF) comprising a plant-wide network coupling at least one controller platform. The controller platform comprising computing hardware and a memory, and at least one application module (AM) contained in the memory. The AM comprising a control application, data, configuration and state information for the controller platform, wherein the at least one controller platform is coupled by an input/output network to I/O devices coupled to field devices that are coupled to processing equipment on a field level of an industrial processing facility (IPF). The method further comprises communicatively coupling a storage appliance to the plant wide network and causing the controller platform to send a copy of the AM contained in the controller platform to the storage appliance.

In a second embodiment a method is disclosed comprising, a network process control system in an industrial processing facility (IPF) comprising a plant-wide network coupling at least one server to a plurality of controller platforms all coupled to one another by at least one private path redundancy network for providing a controller pool. Each controller platform having at least one controller comprising computing hardware and a memory, and at least one application module (AM) pool including a plurality of AMs, wherein the plurality of controller platforms are coupled by an input/output (I/O) mesh network to I/O devices coupled to field devices that are coupled to processing equipment on a field level of an industrial processing facility (IPF). The method further includes providing a control application module orchestrator (CAMO) coupled to the plant-wide network for dynamically deploying the plurality of AMs to the controller platforms. The CAMO including a database of attribute data that associates the controller platforms in the controller pool with an AM in the AM pool. The method additionally comprises communicatively coupling a storage appliance to the plant wide network; and causing a copy of each AM in the AM pool and a copy of the CAMO database to be contained in the storage appliance.

In a third embodiment a network control system is disclosed used within an industrial processing facility (IPF) comprising, a plant-wide network coupling at least one controller platform. The controller platform comprising computing hardware and a memory and at least one application module (AM) contained in the memory. The AM comprising a control application, data, configuration, and state information for the controller platform, wherein the at least one controller platform is coupled by an input/output network to I/O devices coupled to field devices that are coupled to processing equipment on a field level of an industrial processing facility (IPF). A storage appliance coupled to the plant-wide network is arranged to receive a copy of the AM contained in the controller platform.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As used herein an industrial process facility includes field devices and processing equipment that runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

Figure 1:
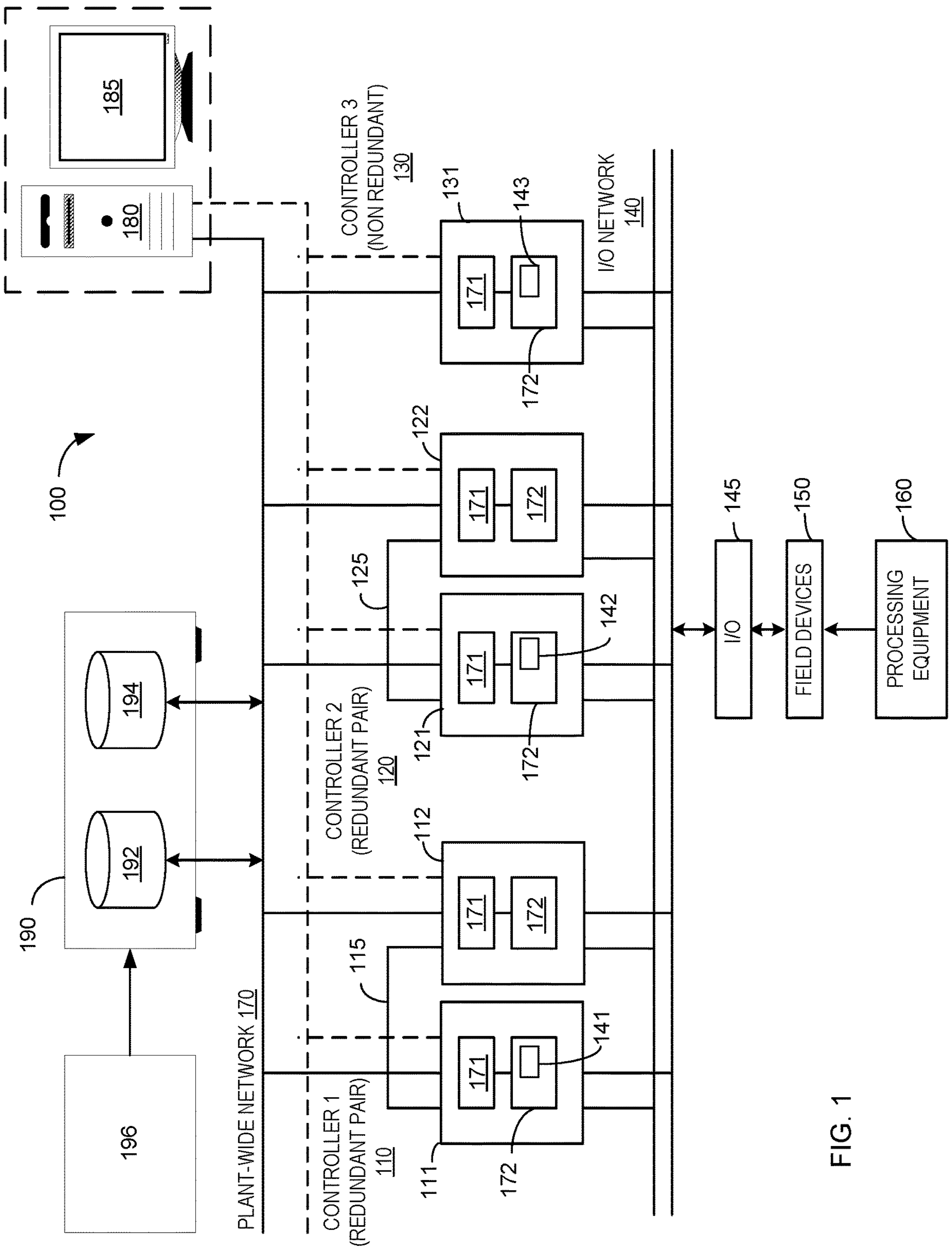
FIG. 1 illustrates a network control system with AMs configured in a dedicated 1:1 configuration, in accordance with the present disclosure.

FIG. 1 shows a network process control system 100 for an industrial process facility (IPF) with AM's in a 1:1 ratio with the controller platforms in the network process control system 100 that shows 3 controller platforms 110 and 120 with redundant controllers, with each controller platform having a controller pair 111, 112 and 121, 122, respectively, and one controller 130 being a single (non-redundant) controller. Each controller includes computing hardware 171 and an associated memory 172. A dedicated (fixed) AM is stored (resides) in one of the respective memories 172 of each of the controller platform, shown as AM 141 in memory 172 of controller 111. An AM 142 which is analogous to AM 141 provides an AM for the primary controller 121 and a backup AM for the redundant controller 122, An AM 143 provides an AM for controller 130 which can be an AM for only a primary controller, or an AM for a primary controller and backup AM for a redundant controller. The controllers in redundant controller pairs 110 and 120 platforms are shown coupled to one another by a first private path 115 and a second private path 125. The controller platforms 110, 120, 130 are each shown coupled by an input/output (I/O) network 140 for controlling a portion of the processing equipment 160 shown coupled through I/O devices 145 to field devices 150 that comprises sensors and actuators. There is also shown a plant wide network 170 (e.g., such as an Ethernet network) between the controller platforms and server(s) 180, and at least one Human-Machine Interface (HMI) 185.

When redundant controller platforms shown as redundant controller 110 and redundant controller 120 are configured as in FIG. 1, the primary controller and backup controller can change roles with the backup controller becoming the primary controller when the primary controller is disabled so that the dedicated AM for the controller platform can support a different controller. However, the dedicated AMs (such as AM 141 and AM 142 shown in FIG. 1) always only supports a fixed pair of controllers (primary controller 111 and secondary controller 112 in the system 100 shown in FIG. 1).

However, if the primary controller 111, 121 of a redundant controller pair 110, 120 fails when it is not synchronized, or only partially synchronized, then the backup controller 112, 122 typical does not take over. In certain controller deployments memory retention systems using non-volatile memory, random access memory (RAM) systems or backup battery systems are used to retain memory 172 to recover the primary configuration and state of an AM 141, 142, 143. If the hardware has failed and the application module AM 141, 142, 142 replaced, then user intervention is required to restore the configuration.

An embodiment of the present disclosure provides a storage appliance 190 connected to the plant wide network 170, that includes memory devices containing backup applications 192 and 194 stored in the memory devices. The storage appliance 190 provides a backup for the CEE of each AM 141, 142 and 143 in network process control system 100. The storage appliance 190 is comprised of persistent memory devices, which represent any structure(s) capable of storing and facilitating retrieval of information (such as data, program code, and/or other suitable information on a temporary or permanent basis). The storage appliance 190 memory devices may also use random access memory RAM or any other suitable non-volatile memory device(s) that can store and retrieve information. Preferably the storage appliance 190 may contain one or more components or memory devices supporting longer-term storage of data, such as a hard drive, solid-state drives, or optical disc.

Backup application 192 may be contained in a memory device of storage appliance 190 that is partitioned to provide storage for the CEE configuration, settings, and data of AM 141 of redundant controller platform 110, and storage for the backup for the CEE configuration, settings, and data of AM 142 of redundant controller platform 120. Backup application 194 provides for the separate storage for the CEE configuration, settings and data for AM 143 of the non-redundant controller platform 130. The both backup applications 192 and 194 may be contained in separate partitions in the same memory device or may be contained in different memory devices in storage appliance 190.

The backup applications 192, 194 of storage appliance 190 only provide storage for the controller platforms 110, 120 and 130 of the network process control system 100. The storage appliance 190 is not capable of, or configured to, take over the control functions of a primary controller. The storage appliance 190 is used to recover a primary controllers CEE state when a primary controller has failed in order to recover the CEE state to the failed controller when it is recovered. Each backup application 192, 194 receives a copy of the CEE contained in an AM 141, 142, 143 of each controller platform 110, 120, 130 connected to system 100. The redundant controller platforms 110, 120 using backup application 192 and the non-redundant controller platform 130 using backup application 194. The storage appliance 190 may have multiple backup application contained in appliance 190 and can be arranged as one or more virtual machines (VMs) and/or embedded nodes to provide backup applications to all CEEs of redundant and non-redundant controller platforms that may be connected in a system.

The storage appliance 190 of the present embodiment is configured to receive full initial synchronization of each AM in the system 100 and to maintain synchronization of the backup application 192, 194 at the same time as the primary controller 111, 112 synchronizes a backup controller 121, 122 for each redundant controller platform 110, 120. Additionally, each backup application 192, 194 stores data from each AM as of the last cleanpoint, in order to have the same state as the CEE stored in memory 172 of the backup controller.

In the present embodiment the storage appliance 190 is preferred to have electrical power supplied to it from have a separate power supply 196. Power supply 196 supplies power only to storage appliance 190. If the system 100 experiences a power failure, power supply 196 would continue to power and maintain the storage appliance 190 and the CEE data, configuration and settings stored in the backup applications 194. Adding another level of reliability for the data, configuration and settings stored in the storage appliance 190.

When the primary controller of a controller platform or the primary controller of a non-redundant controller platform, requires to have its AM recovered, the stored CEE for a controller platform may be downloaded from the backup application 192, 194 of the storage appliance 190 back to its AM. For example, recovering the CEE for the AM 141 of primary controller 111 of redundant controller platform 110.

Figure 3:
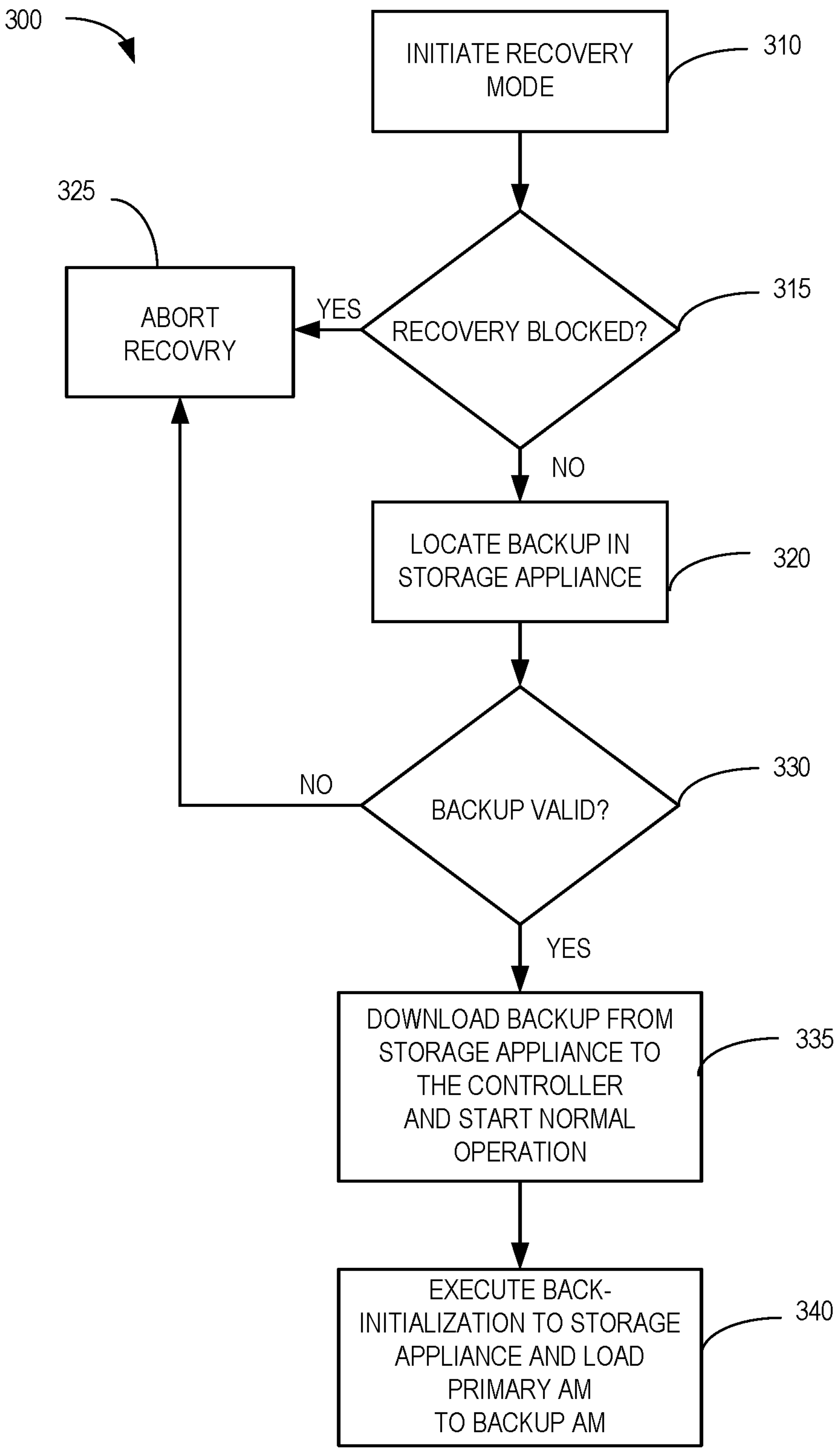
FIG. 3 illustrates a block diagram of the recovery mode used to recover the backup AM(s) sored in the storage appliance in accordance with the present disclosure.

FIG. 3 illustrates the recovery mode 300 used by an embodiment of the present disclosure to recover the backup AM sored in the storage appliance 190. When the primary controller 111 of FIG. 1 is started upon recovery after a failure, the primary controller 111 enters into recovery mode 310. In the recovery mode, a new configuration load to the AM 143 is blocked. The recovery mode can be blocked 315, for example, when requiring an updated version of the CEE to be loaded into memory 171, which aborts the recovery 325 of the CEE from the backup application 192 from storage appliance 190.

If the recovery mode is not blocked, the primary controller 111 via the recovery program queries the storage appliance 190 at step 320 and locates the backup copy of the CEE for primary controller 111 in storage application 192. In step 320 the recovery program then prepares to download a complete copy of the CEE stored in the storage application 192 as of the last cleanpoint. In preparing for the download, the primary controller 111 checks to confirm that the CEE in the backup application 192 is valid. For example, the controller may check for the latest firmware version, time of the last load/delete, or write of data, time of the last cycle, etc. The validation ensuring that the latest backup copy in the storage application 192 is being downloaded.

Next in step 335 the backup copy of the CEE is loaded into the AM of memory 172 and the primary controller 111 is switched to a normal primary mode of operation.

Depending on the state of the primary controller 111 when it switched to a primary mode of operation, cold/warm initialization rules are utilized. For example, in cold starting the CPU of the primary controller from power off, some values of the state may be initialized before execution starts, e.g. regulatory control block Modes set to manual if connected directly to IO and program processing begins again with initial values. A warm start does fewer initializations than a cold start, e.g. regulatory control block Modes are left unchanged. A warm start is also possible after the controllers have lost power as well. A cold or warm start is a user choice, or automatically entered based on certain conditions, such as for example such as time of power loss, and how to start based on how close the restored state information matches the current state of the process with program processing starting once again using data retained at the time of the initialization.

Finally, in step 340 when the controller 111 is operating in its primary role, the controller executes a back-initialization writing a copy of the CEE in the primary controllers AM 141 back to the storage application 192 of storage appliance 190.

It will be well understood that the recovery mode 300 described above can also be used to recover the backup CEE for the primary controller 121 of the redundant controller platform 120 from storage application 192. Also, the recovery mode 300 can also recover the backup CEE for the primary controller 131 of the non-redundant platform 130 from storage application 194.

In certain IPFs a plurality of controller platforms coupled to one another by a private path redundancy network provide a controller pool operating in a control HIVE configuration. In a control HIVE, each controller platform may have at least one controller including computing hardware and a memory, and an AM pool of a plurality of AMs, wherein the controller platforms are coupled by an I/O mesh network to I/O devices coupled to field devices that are coupled to processing equipment in the IPF. A controller application module orchestrator (CAMO) is coupled to the plant wide network for dynamically deploying the AMs to the controller platforms, wherein the CAMO receives resource consumption attribute data regarding the controller platforms including a pool of available storage in the memory and processing resources available for the computer hardware. Based on resource consumption attributes, the plurality of AMs are at least partially automatically deployed to the controller platforms.

An aspect of a control HIVE is the use of a controller pool in an I/O mesh network. An I/O mesh is an I/O network configuration where instead of I/O's being bound via a physical, dedicated link to one specific process controller the I/O's are instead meshed at the channel level to all controllers in a pool (or group) of controllers, so that any one process controller in the pool of controllers can have a flexible workload assignment and able to act on inputs and outputs in the I/O mesh network. The I/O mesh network enables the flexible redundancy scheme. In brief, an I/O mesh network is a shared I/O network where multiple controllers and multiple I/O modules and devices reside on the same network, such that the I/O resources can be shared amongst the process controllers.

Figure 2:
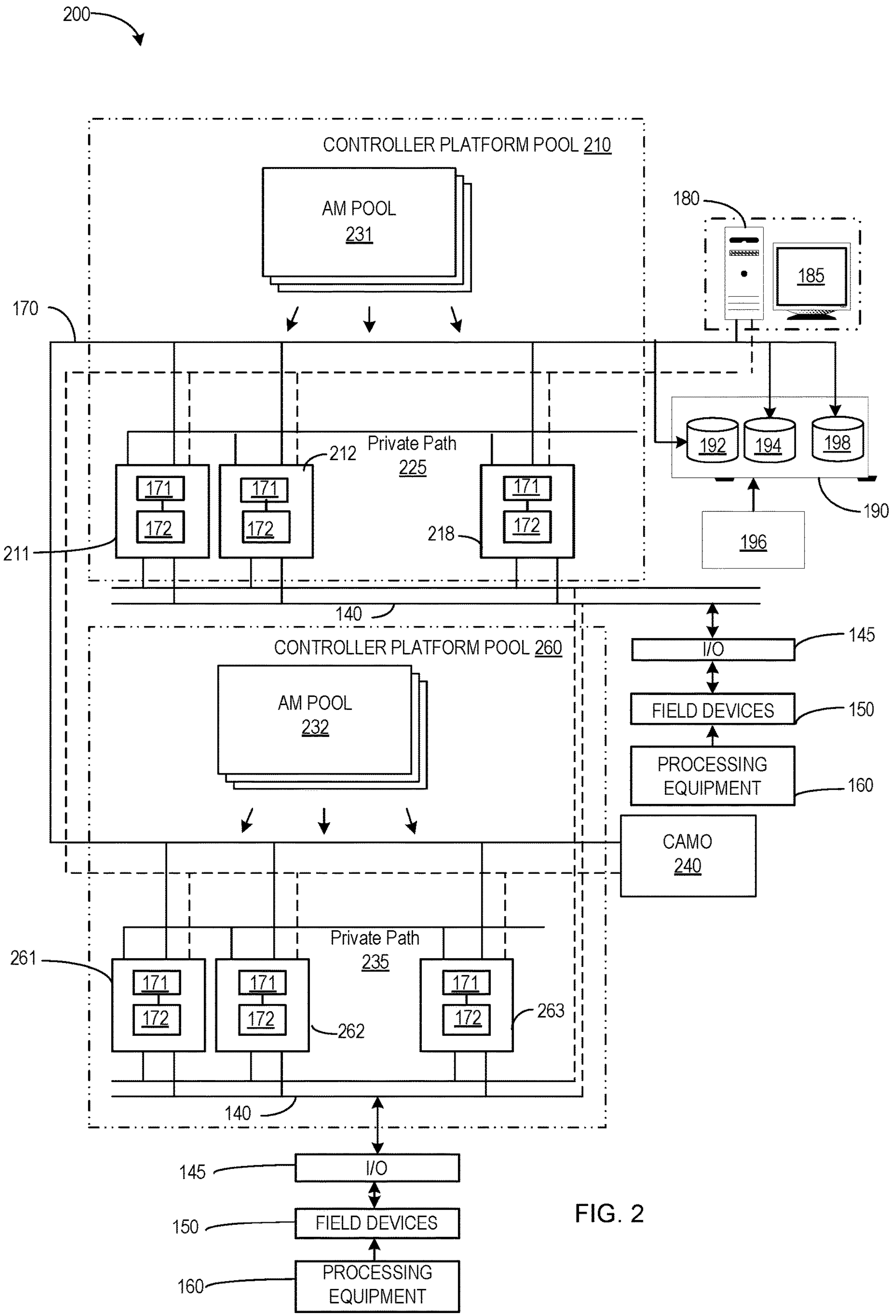
FIG. 2 illustrates an example network control system implemented in a control HIVE configuration, where the AMs are flexibly deployed to other than in a 1:1 fashion to the controller platforms, showing a plurality of controller platforms, in accordance with the present disclosure.

FIG. 2 depicts an example network process control system 200, configured in a control HIVE configuration. The network process control system 200 comprising a first pooled controller platform 210 and a second pooled controller platform 260, where the control HIVE system 200 uses a CAMO 240 for flexibly deploying, including dynamic deployment, the AM's shown as AM pool 231 and AM pool 232 being available to the respective pooled controller platforms 210 and 260, respectively. The controllers in the respective pooled controller platforms 210 and 260 are shown coupled to one another by a first private path redundancy network 225 and a second private path redundancy network 235, each redundancy network with a sufficient speed for time synchronization for providing the pool of controllers shown as first pooled controller platform 210 and a second pooled controller platform 260.

The redundancy networks 225, 235 provide a communication path, for controller pool coordination and synchronization of data traffic. For example, in order for a primary and backup AM in a controller platform to stay synchronized, the primary AM needs to send state data to the backup AM as it runs, so that the backup AM 'knows' exactly the state of the process in order to take over for the primary AM at any time it may need to. It should be noted that other embodiments of network connections can be used between the AMs in AM pools 231, 232 and the controller pools 210, 260, such as for example, the plant wide ethernet network 170 for controlling HIVE management functions such as coordination and synchronization and network segments (not shown) using virtual LANs utilized to separate the traffic from other types of communication.

The controller platform pool 210 is shown including controller 211, controller 212, and a controller N shown as controller 218, which all can be purpose built embedded hardware platforms. Similarly, controller platform pool 260 includes controller 261, controller 262 and controller N shown as controller 263. The controllers each include computing hardware 171 having an associated memory 172. The AM pools in network process control system 200 is shown including a first AM pool 231 associated with the first controller platform pool 210 and a second AM pool 232 associated with the second controller platform pool 260. A plantwide network shown as 170 (such as an Ethernet network) couples together the controllers in the respective controller platform pools 210 and 260, the CAMO 240, the AM pools 231 and 232 and server(s) 180, and at least one Human Machine Interface (HMI) 185.

The CAMO 240 is configured to dynamically deploy the AM's in each of the AM pools 231, 232 to the computing platforms in their respective controller pools 210, 260. The CAMO 240 generally receives inputs to monitor plant topology and computing hardware and memory resources, and in the event of a controller failure the CAMO 240 automatically or with optional user interaction can perform functions such as to restore a new backup AM on a pooled controller platform, a redundant backup controller on a pooled controller platform. The CAMO 240 can provide other responsibilities such as providing information to the user when deploying new AM's to allow the user to decide where AM's run by default, or which would allow the CAMO 240 to make that decision.

The CAMO 240 may be stored in a dedicated server along with the server 180 or even in the cloud. Alternatively, the CAMO may be stored in any memory in system 200, including a distributed arrangement with a portions of the CAMO within the controller pools 210, 260 (not shown).

The AM pools 231 and 232 generally comprise a software 'container' for a control software application. The AM's control software applications can be internally developed software (such as the Honeywell EXPERION CEE, or other advanced application), or 3rd party applications. The AM's can be inherently redundancy aware capable (as is the case with the EXPERION CEE).

The network process control system 200 includes an I/O mesh network 140, connected between the controller platform pools 210, 260 and the I/O devices 145. The I/O mesh network 140 is needed because the job of a controller is to process input data that comes from inputs including sensor inputs, and make intelligent decisions about how to change the outputs that are coupled to actuators in order to govern the process itself, where the controllers communicate directly with the I/O devices 145. Although shown serving two controller platform pools 210 and 260, the I/O mesh network 140 can serve one controller pool, or three or more controller platform pools.

Each controller pool 210 and 260 is thus a flexible pool of controller resources, for hosting a set AM's shown, that can be dynamically managed by the CAMO 240. In FIG. 2, the AM's 231 and 232 have thus been decoupled from the controller platforms (in contrast to being fixed in FIG. 1) by the CAMO 240 such that each controller platform pool can assume the hosting of one or more AM's. For redundant AM's, the AM's can host a primary AM and a backup AM, or multiple AM's of varying roles, provided that the active AM and its backup AM are not on the same controller platform.

Upon the failure of a controller in a controller pool 210, 260, typically due to a hardware component failure, any primary AM's that were running inside of it will switchover to their backup AM running on another controller in the controller platform pool which resumes control albeit non-redundant after the failure. Any backup AM's running on that failing controller will cease to run, leaving their primary AM running elsewhere on the controller platform pool running, unaffected, but temporarily non-redundant. A new backup AM can be brought up automatically by the CAMO 240, with the new backup AM restoring the overall control HIVE configuration of network process control system 200 relatively quickly.

The AM pools 210 and 260 in the control HIVE system deployments can also suffer from the problems discussed above for 1:1 controller deployments. Wherein the backup AM is not synchronized with, or partially synchronized with the primary AM, or a primary AM operating with a non-redundant primary control application requires user intervention to restore the configuration and state of a CEE or control application to a controller. A total power loss and recovery of the control HIVE system requires user intervention to restore the configuration of the platform pool controllers of the control HIVE as well as the CAMO.

The network process control system 200 of FIG. 2 of the present disclosure includes a storage appliance 190 connected to the plant wide network 170, that includes memory devices containing backup applications 192, 194 and 198 stored in the memory devices.

The storage appliance 190 provides a backup for the CEE or advanced applications of each AM contained in the AM pools 231 and 232. The storage appliance 190 is comprised of persistent memory devices, which represent any structure(s) capable of storing and facilitating retrieval of information (such as data, program code, and/or other suitable information on a temporary or permanent basis). The storage appliance 190 memory devices may also use random access memory RAM or any other suitable non-volatile memory device(s) that can store and retrieve information. Preferably the storage appliance 190 may contain one or more components or memory devices supporting longer-term storage of data, such as a hard drive, solid-state drives, or optical disc.

The memory device associated with the first backup application 192 may be partitioned to provide memory storage for the CEE configuration, settings and data of each AM contained in AM pools 231 and 232. A second backup application 194 provides storage for the CEE configuration, settings and data for any AM in AM pool 231 and 232 operating with non-redundant controller platforms. A third backup application 198 provides memory storage backup for the CAMO 240 database. The CAMO 240 database containing inputs, plant topology and computing hardware and memory resources, contained and used by the control HIVE configuration of network process control system 200. Backup application 198 further stores information from CAMO 240 used by the user when deploying new AM's to allow the user to decide where AM's run by default. Backup application 198 receives all CAMO multicasts sent through the plant network 170.

The backup applications 192, 194, 198 of storage appliance 190 only provides storage for the AM pools 231, 232 of the system 200. The storage appliance 190 is not capable of, or configured to, take over the control functions of an AM or a controller. The storage appliance 190 is used to recover the CEE state for a controller AM that has failed. Each backup application 192, 194 receives a copy of the CEE contained in each AM of AM pools 231 and 232. The CEE of redundant controller platforms, using backup application 192 and the non-redundant controller platforms using backup application 194 and the CAMO 240 using backup application 198. The storage appliance 190 may have multiple backup application contained in appliance 190 and can be arranged as one or more virtual machines (VMs) and/or embedded nodes to provide backup applications to all CEEs of a redundant and non-redundant controller platforms that may be connected in the network process control system 200.

The storage appliance 190 of the present embodiment is configured to receive full initial synchronization of each AM in the AM pools 231 and 232 and to maintain synchronization to the backup application 192, 194 at the same time as the primary AM of pools 231, 232 synchronizes a backup AM for each redundant controller platform pool 210, 260. Additionally, each backup application 192, 194 stores data from each AM as of the last cleanpoint, in order to have the same state as the CEE stored in any backup AM contained in the AM pools.

In the present embodiment the storage appliance 190 is preferred to have electrical power supplied to it from a separate power supply 196. Power supply 196 supplies power only to storage appliance 190. If the system 200 experiences a power failure, power supply 196 would continue to power and maintain the storage appliance 190 and the data stored in the backup applications 192, 194 and 198.

Recovery of a control HIVE configuration of network process control system 200, first requires that the CAMO database stored in backup application 198 be restored to CAMO 240. In a control HIVE configuration, the controllers or "hosts" look for a CAMO on network 170 before they self-form into a new control HIVE system. On receiving the backup CAMO database, the CAMO 240 spins up the AM containers in the AM pools 231, 232 restoring the AMs to the controllers and establishing the controller hierarchy of the control HIVE system. The controllers however are initiated with no configuration and state.

Recovery of the AM is the same as was discussed for the 1:1 control deployment of FIG. 1. The recovery mode 300 is shown in FIG. 3. Upon initial of the recovery mode in step 310 the backup application 192 downloads the CEE, or other advances control application to the AMs for the redundant controllers to be restored.

In the recovery mode, a new configuration load to the AM, contained in AM pools 231 and 260 are blocked. The recovery mode can be blocked, for example, when requiring a new version of the CEE or other control application to be loaded. If the recovery is blocked in step 315 the recovery is aborted to step 325.

If the recovery mode is not blocked, the storage appliance 190 locates the backup copy of the CEE in step 320 for primary AMs in storage application 192. The recovery program 300 then prepares to download a complete copy of the CEE stored in the storage application 192 as of the last cleanpoint. In preparing for the download, the controller having a primary role checks in step 330 to confirm that the CEE in the backup application 192 is valid. For example, the controller may check for the latest firmware version, time of the last load/delete, or write of data, time of the last cycle, etc. The validation ensuring that the latest backup copy in the storage application 192 is being downloaded.

Next in step 335 the backup copy of the CEE is loaded into the AM of the AM pool 210, 260 pertaining to the controller having a primary role and switched to a normal primary mode of operation. Depending on the state of the controller when it switched to a primary mode of operation, cold/warm initialization rules are utilized. For example, in cold starting the CPU of the controller from power off, the current configuration is discarded and program processing begins again with initial values. A warm starts restarts the CPU when the controller is not powered off, program processing starting once again using data retained at the time of the initialization.

Finally, in step 340 when the controller is operating in a normal mode, a standard redundancy synchronization is done between the primary AM and its backup AM and the controller executes a back-initialization writing a copy of the CEE in the primary AM back to the storage application 192 of storage appliance 190.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

providing a network process control system in an industrial processing facility comprising a plant-wide network coupling a controller platform, the controller platform is a redundant controller pair, comprised of a primary controller and a backup controller, wherein the primary controller contains an application module (AM) and the AM is shared by the primary controller to the backup controller, the AM comprising a control application, data, configuration and state information for the controller platform, wherein the controller platform is coupled by an input/output (I/O) network to I/O devices coupled to field devices that are coupled to processing equipment on a field level of the industrial processing facility;

communicatively coupling a storage appliance to the plant-wide network; and causing the controller platform to send a copy of the AM contained in the primary controller to the storage appliance when the primary controller shares the AM with the backup controller.

2. The method of claim 1, wherein the storage appliance includes at least one memory device comprising a first backup application and a second backup application, the method further comprising:

storing the AM from the controller platform in the first backup application.

3. The method of claim 2, wherein the method further comprises storing the AM from the primary controller of the redundant controller pair in the memory device in the second backup application.

4. The method of claim 1, wherein the primary controller initiates a recovery mode comprising:

locating the AM in the storage appliance;

downloading the AM from the storage appliance to the primary controller;

restarting the primary controller using the downloaded AM; and sending the downloaded AM to the backup controller.

5. The method of claim 1, wherein the controller platform initiates a recovery mode comprising:

locating the AM in the storage appliance;

downloading the AM from the storage appliance to the controller platform;

restarting the controller platform using the downloaded AM.

6. The method of claim 1, wherein the storage appliance is powered by a power supply separate from the power supply powering the network process control system.

7. A method, comprising:

providing a network process control system in an industrial processing facility (IPF) comprising a plant-wide network coupling at least one server to a plurality of controller platforms all coupled to one another by at least one private path redundancy network for providing a controller pool, each controller platform of the plurality of controller platforms is a redundant controller pair, comprised of a primary controller and a backup controller, wherein the primary controller contains an application module (AM) and the AM is shared by the primary controller to the backup controller, wherein the plurality of controller platforms are coupled by an input/output (I/O) mesh network to I/O devices coupled to field devices that are coupled to processing equipment on a field level of an industrial processing facility (IPF);

providing a control application module orchestrator (CAMO) coupled to the plant-wide network for dynamically deploying a plurality of AMs to the plurality of controller platforms, the CAMO including a CAMO database of attribute data that associates each controller platform in the controller pool with an AM in at least one AM pool;

communicatively coupling a storage appliance to the plant-wide network; and causing a copy of each AM in the at least one AM pool and a copy of the CAMO database to be contained in the storage appliance.

8. The method of claim 7, wherein causing the copy of each AM in the at least one AM pool to be contained in the storage appliance comprises:

storing each AM from the at least one AM pool in the first backup application.

9. The method of claim 8, wherein causing the copy of the CAMO database to be contained in the storage appliance comprises:

storing the copy of the CAMO database in the second backup application in the memory device.

10. The method of claim 7, wherein in a recovery mode the method comprises:

locating the copy of the CAMO database in the storage appliance;

downloading the copy of the CAMO database from the storage appliance to the CAMO and restoring the attribute data;

downloading each AM from the storage appliance and restoring the downloaded AMs to the at least one AM pool;

restarting each controller platform using the downloaded AMs in the AM pool; and executing back-initialization of the downloaded AMs to the storage appliance.

11. The method of claim 7, wherein the storage appliance is powered by a power supply separate from the power supply powering the network process control system.

12. A network control system within an industrial processing facility, the network control system comprising:

a plant-wide network coupling a controller platform, the controller platform is a redundant controller pair, comprised of a primary controller and a backup controller, wherein the primary controller contains an application module (AM) and the AM is shared by the primary controller to the backup controller, the AM comprising a control application, data, configuration and state information for the controller platform, wherein the controller platform is coupled by an input/output (I/O) network to I/O devices coupled to field devices that are coupled to processing equipment on a field level of the industrial processing facility; and a storage appliance coupled to the plant-wide network arranged to receive a copy of the AM contained in the primary controller from the controller platform when the primary controller shares the AM with the backup controller.

13. The network control system of claim 12, wherein the storage appliance memory device is a persistent memory device capable of storing and facilitating retrieval of information.

14. The network control system of claim 12, wherein the storage appliance includes a memory device comprising a first backup application that stores a copy of the AM from the controller platform.

15. The network control system of claim 14, wherein the memory device contains a second backup application containing the AM from the primary controller of the redundant controller pair.

16. The network control system of claim 14, wherein in a recovery mode the storage appliance is arranged to download the copy of the AM in the first backup application to the controller platform and restarting the controller platform using the downloaded copy of the AM.

17. The network control system of claim 15, wherein in a recovery mode the storage appliance is arranged to download the copy of the AM in the second backup application to the primary controller of the redundant controller pair and restarting the primary controller using the downloaded copy of the AM and sending the downloaded copy of the AM to the backup controller.

18. The network control system of claim 12, wherein the network control system includes a power supply that provides electrical power to only the storage appliance.

* * * * *